Figure 1:
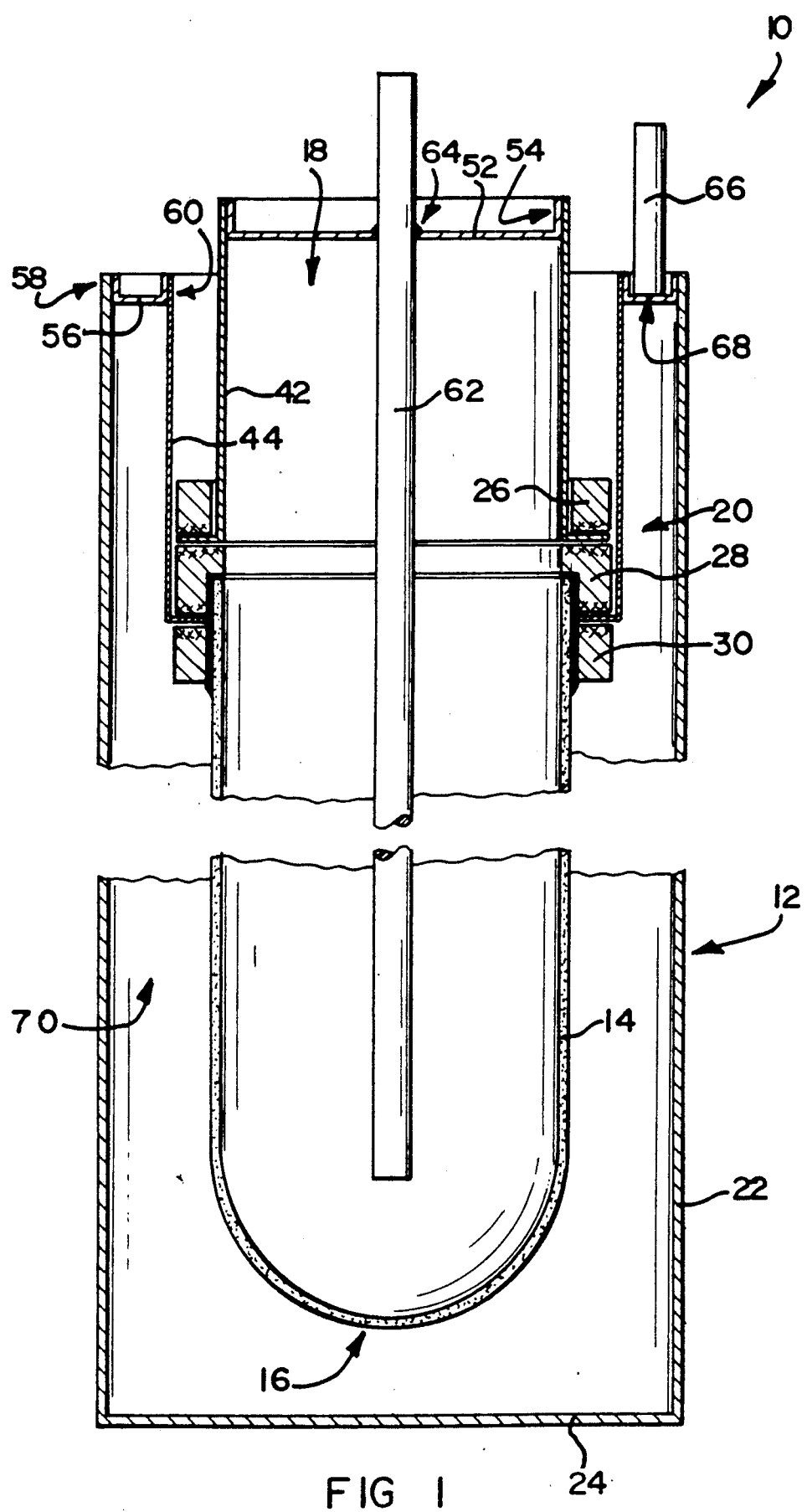

United States Patent [19]

Baker et al.

[11] Patent Number: 5,009,357
[45] Date of Patent: Apr. 23, 1991

[54] JOINING OF CERAMIC COMPONENTS TO METAL COMPONENTS

[75] Inventors: Derrick J. Baker, Chieveley; Walter G. Bugden; Peter R. Smith, both of Nottingham, all of England

[73] Assignee: Lilliwyte Societe Anonyme, Luxembourg

[21] Appl. No.: 385,323

[22] Filed: Jul. 25, 1989

[30] Foreign Application Priority Data

Jul. 28, 1988 [GB] United Kingdom ............... 8818050

[51] Int. Cl.⁵ .................. B23K 101/36; B23K 103/16
[52] U.S. Cl. ..................................... 228/122; 228/124
[58] Field of Search ............... 228/122, 123, 124, 193, 228/194, 234

[56] References Cited

U.S. PATENT DOCUMENTS

| | | | |
|---|---|---|---|
| 3,009,840 | 11/1961 | Emeis | 228/123 |
| 3,651,562 | 3/1972 | Hambleton | 228/123 |
| 4,448,853 | 5/1984 | Fischer et al. | 228/56.3 |
| 4,485,150 | 11/1984 | Tsuno . | |
| 4,664,942 | 5/1987 | Park . | |

FOREIGN PATENT DOCUMENTS

| | | | |
|---|---|---|---|
| 0147360 | 3/1985 | European Pat. Off. . | |
| 0203432 | 3/1986 | European Pat. Off. . | |
| 0232028 | 12/1987 | European Pat. Off. . | |
| 2027944 | 11/1972 | France . | |
| 2390024 | 1/1978 | France . | |
| 425864 | 11/1974 | U.S.S.R. | 228/122 |
| 1100065 | 6/1984 | U.S.S.R. | 228/194 |
| 540991 | 11/1041 | United Kingdom . | |
| 881832 | 11/1961 | United Kingdom . | |
| 1134301 | 11/1968 | United Kingdom . | |
| 1574804 | 9/1990 | United Kingdom . | |

OTHER PUBLICATIONS

Patee, "Joining Ceramics to Metals and Other Materials", WRC Bulletin 178, pp. 315–357 (Nov. 1972).
Chemical Abstract No. 182037a, Columbus, Ohio, 1987, Nov., No. 20.
Lascar, "Comparison of Ceramo-Metallic Bonding by Brazing or in Solid State", Materiaux Electricite, n421, Jun.-Jul. 1987.
Air Force Propulsion Laboratory of the Research and Technology Division, Air Force Systems Command, Wright-Patterson Air Force Base, Ohio, "Ceramic to Metal Seals for High Temperature Thermionic Converters", Technical Documentary Report No. RTD-T-DR-63-4109 (Oct. 1963).

Assistant Examiner—Sam Heinrich
Attorney, Agent, or Firm—Arnold, White & Durkee

[57] ABSTRACT

The invention provides a method of joining together a ceramic component and a metal component. According to the invention a surface of the ceramic component is metallized with a metallizing metal to form a metallized layer thereon. The metal component is then thermocompression bonded to the metallized layer, optionally after the metallized layer is plated with a continuous metal layer. For electrochemical cell applications, the ceramic component is typically alpha-alumina, the metal of the metallized layer is typically selected from tantalum, titanium, vanadium, tungsten and molybdenum, and the metal component typically comprises, in metallic or alloy form, at least one of iron, nickel, cobalt, chromium, manganese or copper.

17 Claims, 2 Drawing Sheets

JOINING OF CERAMIC COMPONENTS TO METAL COMPONENTS

This invention relates to the joining of ceramic components to metal components by thermocompression bonding. More particularly it relates to a method suitable for joining metal components to alumina components, particularly alpha-alumina components, useful in the manufacture of electrochemical cell housings.

According to the invention a method of joining together a ceramic component and a metal component comprises the steps of:

metallizing a surface of the ceramic component with a metallizing metal to form a metallized layer thereon; and thermocompression bonding the metal component to the metallized layer.

By 'metallize' is meant to coat a surface of a substrate, which may be non-metallic, with a thin layer of metal, which layer need not be continuous. Metallizing the surface of the ceramic component may comprise forming a metal matrix on said surface, the matrix having a continuous glass phase dispersed therein, the metallizing step including applying the metallizing metal to said surface and then heating the ceramic component to a temperature of above 800° C. under a reducing atmosphere in the presence of glass-forming constituents.

By glass phase is meant a hard amorphous substance which has been fused together by heat and comprises one or more of the oxides of silicon, boron or phosphorous, together with one or more basic oxides such as those of sodium, magnesium, calcium or potassium, and optionally one or more other glass forming oxides such as those of titanium, manganese, lead or the like. How the metallized layer having the glass phase is formed, depends on the nature of the ceramic.

In the case of certain ceramics, such as debased aluminas [i.e. aluminas having a purity of less than about 99%] heating to temperatures above 800° C., e.g. a 1000°–1800° C., results in the migration of a glass phase from the interior of the ceramic to the surface of the ceramic, where it becomes dispersed in the metal matrix.

In the case of other ceramics, such as high purity ceramics, e.g. aluminas with a purity of above about 99%, there is insufficient glass phase within the ceramic to lead to said formation and migration upon heating to these temperatures, and it is necessary to apply the constituents of a glass to the surface of the ceramic prior to heating, so that the heating causes these constituents to fuse together and form the glass phase of the metallized layer on the ceramic surface.

In either case it is necessary to ensure that the metallized layer comprises a metal matrix in which the glass phase is dispersed. This can be effected in accordance with the invention by a method in which the step of applying the metallizing metal to the surface of the ceramic component comprises painting said surface with a paint containing, dispersed therein, particles of the metallizing metal or an oxide thereof. This will be done prior to the heating typically using a paint layer comprising a paint base, such as a nitrocellulose paint base, containing said metal or preferably an oxide of the metal in question dispersed in the paint base in particulate form, the subsequent heating preferably being to a temperature of 1000°–1800° C. under said reducing atmosphere.

Said particles may have an average particle size of at most 10 microns, sufficient paint being applied to said surface to provide a metallized layer which, when polished, displays a polished surface at least 50% of whose area is provided by the metallizing metal, the balance being provided by a glass phase. As indicated above, the method may, for high purity ceramics, include applying glass-forming constituents to said surface prior to the heating.

Preferably the metal or metal oxide particles in the paint, and particles of any glass constituents therein, are in finely divided form. The method may thus include milling the solids in the paint, e.g. in a ball mill, until the paint solids have an average particle size of less than said 10 microns, preferably 2–5 microns.

In other words, in accordance with the invention the step of forming the metallized layer on the ceramic surface may comprise applying a paint layer to the ceramic surface, comprising a paint base such as a nitrocellulose paint base, which has dispersed therein the metal in question or the oxide thereof in finely divided form, and optionally dispersed therein an appropriate mixture of glass constituents, followed by said heating to a temperature in the range 1000°–1800° C. for a period sufficient to form the metallized layer and sufficient to reduce any said metal oxide in the paint to the metal in question. Usually the temperature will be about 1400°–1500° C. In this regard it should be noted that any metal oxide which will be reduced, will be the oxide of the metal which will ultimately be present in the metallized layer in finely divided metallic form, and will not be any glass constituent which happens to be a metal oxide. The metal oxide glass constituents will in fact not be reduced during the heating.

Conveniently, the reducing atmosphere is a hydrogen-containing atmosphere. Atmospheres which are hydrogen/nitrogen mixtures can be used, containing from as little as 10% by volume hydrogen up to substantially pure hydrogen. Usually, however, the $H_2:N_2$ volume ratio will be in the range 1:9 to 1:3. Dry reducing atmospheres give weaker seals, so that it is preferable to employ a moist atmosphere having a dew point of say 20°–30° C., which can be obtained by bubbling the hydrogen/nitrogen mixture through water before it is used for the reduction. Accordingly, the reducing atmosphere may comprise water vapour and at least 10% by volume of hydrogen, any constituent of the atmosphere other than the hydrogen and water being chemically inert with regard to the ceramic component and the metallized layer at the temperature to which the heating takes place.

If necessary, the outer surface of the metallized layer may be further treated, before the metal component is compression bonded thereto, by plating said outer surface with metal to form a metal layer on the metallized layer. Thus the method may include the step, after the metallizing has been effected, of plating the metallized layer with a continuous metal layer having a thickness of at least 2 microns. When such plating is contemplated, the metallized layer, while it need not provide continuous coverage, is preferably in the form of a continuously interconnected matrix or network, to permit plating over the whole of the outer surface of the metallized layer.

Forming the paint layer may be by brushing, spraying, tape transfer or silk-screening, and will be to a thickness, e.g. 12–15 microns, sufficient to provide an adequate surface density or surface loading of metal in the metallized layer, to permit a good bond between the metallized layer and the subsequently formed plated metal layer. Metallized layers which, when polished, have a surface constituting about 70% area of metal matrix, say 60–80%, the balance being glass phase, have been found to be adequate.

When the paint contains glass constituents, the thickness of the paint layer needed will also depend on the thickness of the metallized layer required, and thus on the concentration of glass constituents in the paint. As regards the concentration of the metal or metal oxide in the paint, numerous various metallizing paint formulations are available, a number of which are proprietary formulations, which can in principle be used, an example being one in which the ratio between glass constituents and reducible molybdenum oxide is such as to give ratio by mass of 2:3 of glass to molybdenum.

As indicated above, a particular application of the present invention is expected to be in the manufacture of electrochemical cell housings. Thus, when the components [the ceramic component and the metal component] are for use in the construction of high temperature electrochemical cells, the ceramic component may comprise alpha-alumina, the metal of the metallized layer comprising at least one metal selected from the group consisting of tantalum, titanium, vanadium, tungsten and molybdenum, and the metal component comprising at least one metal selected from the group consisting of iron, nickel, cobalt, chromium, manganese and copper. These metals, and in particular chromium or manganese, may be present as constituents of alloys. Thus, the metal of the metallized layer will typically be a so-called strong carbide-forming metal of the type well known for their hardness and abrasive properties. Such metals will also be selected so that any oxide thereof present initially, e.g. in the paint layer, will be reduced to the corresponding metal under the reducing atmosphere at the temperature attained during the heating, as contrasted with the glass constituents which will not be reduced in this fashion.

As mentioned above, various proprietary metallizing processes are known. Thus the invention contemplates the possibility of using e.g. the molybdenum metallizing process available in Great Britain from Lodge Ceramics Plc, or the tungsten metallizing process available from Ferranti Instrumentation Plc; and low temperature metallizing paints can be employed, such as those which need be heated to no more than about 1100° C., available in the United States from International Technical Associates. These proprietary paints and processes involve applying a mixture of glass constituents with a metal and/or a reducible metal oxide powder to a ceramic surface and are suitable for pure ceramics, but can naturally also be used on debased ceramics which form their own glass phase as described above.

Plating the metallized layer with metal, if desired, can be carried out by any convenient method, e.g. electroplating, gas phase deposition, sputtering, etc. Preferably the plating is such as to form a continuous metal layer on the metallized layer, and its thickness, as indicated above, is preferably at least 2 microns, e.g. 2–6 microns. As indicated above, the metal content of the metallized layer should be sufficiently high to permit the plating to be carried out effectively, and to permit the formation of a strong, continuous bond between the metallized layer and the plated metal layer.

Generally, any metal used for any plating will be one which can form an effective thermocompression bond with the metal of the metal component. It will thus usually, although not necessarily, be the same metal as that of the metal component, and it should at least be compatible with the metal of the metallized layer and with the metal component.

It is contemplated that a particular application of the present invention in the manufacture of electrochemical cell housings will be of housings of the type comprising a beta-alumina tube located within an outer metal casing wherein the tube has an open end and is attached to the casing via an annular alpha-alumina ring at said open end, the alpha-alumina ring being thermocompression bonded to at least one metal ring, and thereafter, the alpha-alumina ring being attached to the open end of the beta-alumina tube by glass welding and at least one of said metal rings being attached by metal welding to the casing or to a metallic closure for the beta-alumina tube. Naturally, the metal component should have a sufficiently smooth surface finish on its bonding surface and be free of excessive scratches, so as to promote a leak-tight bond.

The metal employed for the metal rings will naturally be compatible in the intended cell environment with the intended active cell substances. For example, when the cell is intended to have, as active anode or cathode substances, substances such as the alkali metal or alkaline earth metals, chalcogens such as sulphur or selenium, and is intended to have electrolytes such as alkali metal or alkaline earth metal halides or haloaluminates, the metal of the rings may comprise nickel or a nickel-based or nickel-containing alloy, or iron or a ferrous alloy, such as Inconel, Fecralloy, or the Nilo series of alloys, e.g. Nilo K (otherwise known as Kovar). Possible thermally induced stress arising from differential thermal expansion between the alpha-alumina and the metal ring or rings in question should also be borne in mind in selecting the metal to be used, and the aforesaid metals are believed to be suitable from the point of view of avoiding thermally induced stress.

For thermocompression bonding such metals to alpha-alumina with a reasonably short heating regime or cycle time, temperatures in excess of 800° C. are typically required. The thermocompression step of the present invention may thus take place at a temperature in the range of 800°–1400° C., e.g. 1050°–1250° C. and typically 1100° C., the alpha-alumina and metal being pressed together by pressures in the order of 5–200 MPa, e.g. 10–50 MPa, and typically 25 MPa, for cycle times of the order of 15–60 minutes, e.g. 15–45 minutes and typically 30 minutes. Accordingly, the thermocompression bonding is typically effected by urging the metal component against the surface of the ceramic component having the metallized layer at a pressure of 5–200 MPa and at a temperature of 800°–1400° C. for a period of 15–90 minutes or more. For example, for nickel a temperature of 1050° C. and a pressure of 50 MPa, applied for a cycle time of 30 minutes is suitable, or, instead, a temperature of 900° C., a presure of 36 MPa and a cycle time of 60–90 minutes. Heating rates of up to 1500° C./hr or more may be employed for heating from ambient up to the maximum temperature, such heating rates conveniently being in the range of 500°–700° C./hr, typically 600° C./hr. Similar cooling rates may be employed. During the thermocompression bonding, it may be desirable to select the parameters employed so as to avoid or reduce the formation of intermetallic compounds.

In accordance with the present invention each metal ring may be sandwiched between a pair of alpha-alumina rings, to form a sandwiched or stacked assembly, and the assembly may then be subjected to thermocompression bonding, in a uniaxial press. Even if a sandwiched construction is not employed, uniaxial pressing can conveniently be employed. After the thermocompression bonding, one or more of the alpha-alumina rings will typically be glass welded to the mouth of the beta-alumina tube.

In accordance with the present invention, the surface or surfaces of each alpha-alumina ring to be thermocompression bonded to a metal ring, will be provided with a metallized layer and plated metal layer as described hereinabove.

For the particular nickel- or iron-containing alloys such as Kovar mentioned above, useful in electrochemical cells, a particularly suitable metal for the metallized layer has been found to be molybdenum, and a suitable metal for the plated metal layer on the glass layer has been found to be nickel.

In a particular embodiment of the method, an assembly may be made from three alpha-alumina rings, between metallized surfaces of which are sandwiched, in series, two metal rings. These are then thermocompression bonded together in series in a single thermocompression bonding operation, and the assembly is then glass welded to the open end of the beta-alumina tube, via one or more of the alpha-alumina rings. The two metal rings, which may be provided by radially directed flanges at the ends of concentric metal tubes, can then be attached by metal welding respectively to a metal cell casing and a metal closure for the beta-alumina tube, the metal welding taking place at the ends of the metal tubes remote from the alpha-alumina rings.

In addition to a method, the invention also provides an artifact comprising a ceramic component and a metal component which are joined together by a thermocompression bond between the metal component and a metallized layer on a surface of the ceramic component.

The metallized layer having a metal matrix and a glass phase dispersed in the matrix. Optionally a metal layer is plated on the metallized layer, between the metallized layer and the metal component.

The seal may be between an alpha-alumina ring and a metal ring, for example of the type described in more detail hereinabove and suitable for an electrochemical cell, the metal component being a nickel component or a nickel-containing alloy component such as Kovar.

The invention extends further to an electrochemical cell having a beta-alumina tube and at least one alpha-alumina ring glass welded to the beta-alumina tube, each alpha-alumina ring being thermocompression bonded to a metal ring by means of a seal as described above.

Figure 2:
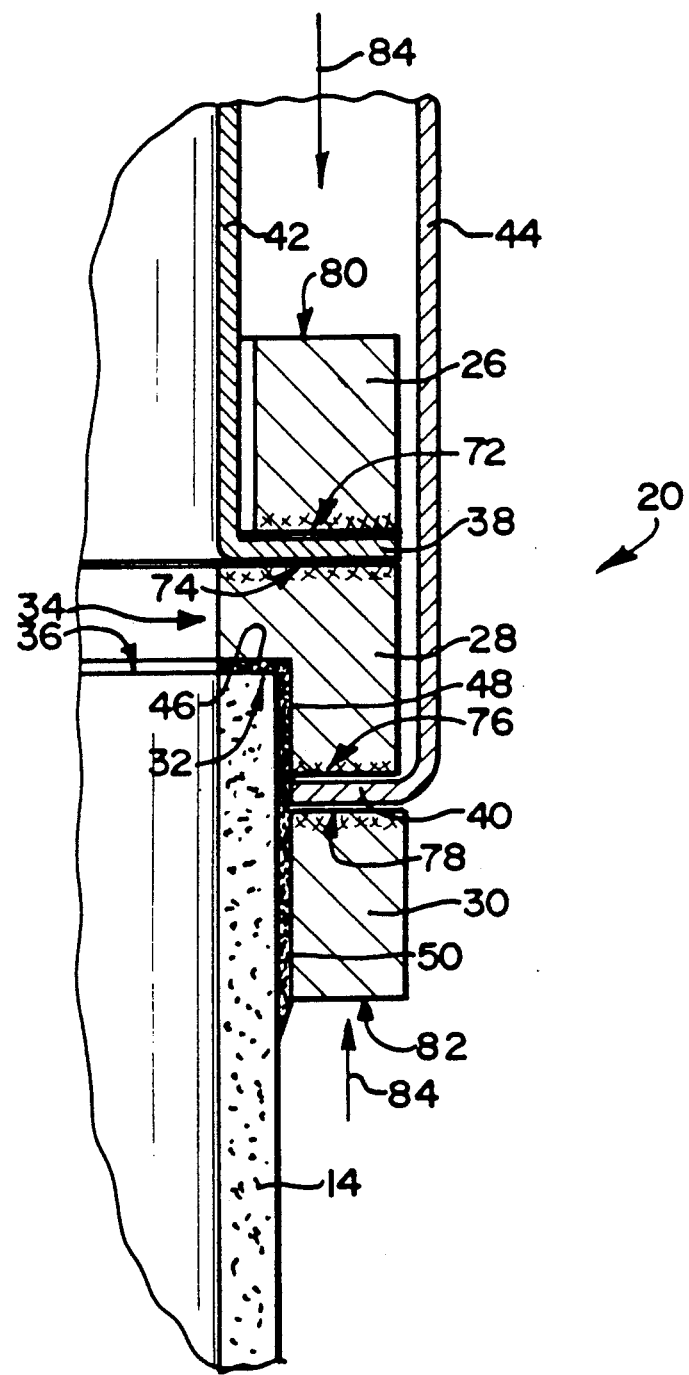

The invention will now be described, by way of example, with reference to the accompanying diagrammatic drawings, in which:

FIG. 1 shows a sectional side elevation of an electrochemical cell housing formed in accordance with the method of the present invention; and FIG. 2 shows a detail on an enlarged scale of the section of FIG. 1.

In FIG. 1 of the drawings, reference numeral 10 generally indicates a cell housing in accordance with the invention, and manufactured in accordance with the method of the invention. The housing is suitable, for example, for an electrochemical cell which has molten sodium as its active anode material, a transition metal chloride such as $FeCl_2$ or $NiCl_2$ dispersed in a liquid electrolyte-permeable porous electronically conductive matrix as its active cathode material, and a molten salt liquid electrolyte comprising sodium aluminium chloride [an equimolar mix of NaCl and $AlCl_3$], the anode (negative electrode) material on the one hand, and the molten salt electrolyte and active cathode (positive electrode) material on the other hand, being provided on opposite sides of the beta-alumina separator which acts as a solid electrolyte, and the matrix being impregnated with the liquid electrolyte.

The housing 10 comprises a cylindrical outer casing 12 in the form of a canister, e.g. of nickel or steel and, concentrically located therein, and beta-alumina tube 14, closed at one end at 16 and open at its other end at 18. The periphery of the open end 18 of the tube 14 is provided with a collar assembly, generally designated 20. The tube 14 forms the solid electrolyte of the eventual cell.

The casing 12 has a cylindrical side wall 22 welded to a circular floor 24, the closed end 16 of the tube 14 being located adjacent but spaced from the floor 24.

The collar 20 comprises three alpha-alumina rings, respectively designated 26, 28 and 30. The rings 26 and 30 are in the form of truncated cylinders, whereas the ring 28 has a rebate at 32 (see also FIG. 2) which defines a circumferentially extending radially inwardly projecting flange 34 on the ring 28. As described in more detail hereunder, the rim 36 of the tube 14, which defines its open end 18, is received in the rebate 32 with the flange 34 resting on the rim 36 via a glass layer.

The rings 26, 28 and 30 are arranged concentrically and end-to-end in series, and sandwiched therebetween in series are two metal rings 38 and 40, the ring 38 being sandwiched between the rings 26 and 28, and the ring 40 being sandwiched between the rings 28 and 30.

The ring 38 is provided by a circumferentially extending radially outwardly projecting flange at an end of a nickel tube 42, and the ring 40 is provided by a circumferentially extending radially inwardly projecting flange at an end of a nickel tube 44. As described hereunder, the ring 38 is thermocompression bonded respectively to the adjacent axially facing opposed surfaces of the rings 26 and 28, whereas the ring 40 is in turn thermocompression bonded respectively to the adjacent axially facing opposed surfaces of the rings 28 and 30.

The ring 30 embraces and surrounds the tube 14 at a position adjacent and spaced from its rim 36, and the ring 28, at its rebate 32, similarly surrounds and embraces the tube 14, but at and immediately adjacent the rim 36. The ring 26 in turn surrounds the tube 42, being closely radially spaced therefrom, at the end of the tube 42 which has the flange or ring 38.

The flange 34 of the ring 28 is welded by glass 46 to the axially outwardly facing surface of the rim 36, and the radially inwardly facing surface of the ring 28 in the rebate 32, is similarly welded by glass 48 to the radially outwardly facing curved surface of the tube 14 adjacent said rim 36. The ring 30 is in turn welded by glass to the outer curved surface of the tube 14 by glass at 50. The glass forms a fluid-tight hermetic seal or weld and is in fact provided as a continuous layer, extending from the glass at 46 on the axially facing surface of the rim 36, around the corner between said rim and the outer curved surface of the tube 14, and axially away from said corner to the glass 50 at the end of the ring 30 remote from the ring 28.

The tube 42 has an open end opposite its end which has the flange 38, and that open end is closed off by an annular closure disc 52 of nickel or stainless steel, welded to the tube 42 at 54 by tungsten inert gas welding. The end of the wall 22 of the casing 12 remote from the floor 24 is in turn closed off by means of an annular closure disc 56 of nickel or stainless steel, welded to the wall 22 of the casing 12 at 58 and welded at 60 to an open end of the tube 44, remote from the flange 40, also by tungsten inert gas welding. A stainless steel rod current collector 62 is shown projecting into the tube 14 via the central opening of the disc 52, to which it is similarly welded at 64 by tungsten inert gas welding, and a stainless steel rod current collector 66 is shown welded to the axially outer surface of the annular disc 56 at 68. The axially outer end of the tube 42 projects axially outwardly from the axially outer end of the tube 44.

This arrangement is suitable for an electrochemical cell in which the anode material is located inside the tube 14, the cathode material and molten salt electrolyte being located in an annular space 70 defined between the outer curved surface of the tube 14 and the inner curved surface of the wall 22 of the casing 12.

Turning to FIG. 2, reference numeral 20 generally designates the collar of the cell 10 of FIG. 1, and unless otherwise specified, the same reference numerals are used for the same parts as described with reference to FIG. 1.

With particular reference to FIG. 2, it will be noted that the ring 26 has an axially facing end surface 72 abutting the ring 38; the ring 28 has an axially facing end surface 74, opposed to the surface 72 and abutting the opposite side of the ring 38; the ring 28 has an oppositely directed axially facing end surface 76 abutting the ring 40; and the ring 30 has an axially facing end surface 78 opposed to the surface 76 and abutting the opposite side of the ring 40.

In accordance with the method of the invention the surfaces 72, 74, 76, 78 are provided with metallized layers containing finely divided molybdenum particles, these metallized layers are plated with nickel outer layers, and the rings 26, 28 and 30 are thermocompression bonded together in series with the rings 38 and 40 as shown in the drawings, to form a sandwich construction. This is effected by uniaxial pressing, the collar assembly being assembled together form the rings 26, 28 and 30, together with the tubes 42 and 44 which provide the rings 38 and 40, the uniaxial pressing being exerted on the axially facing end surface 80 of the ring 26 and the oppositely axially facing end surface 82 of the ring 30, in the direction of arrows 84. This is effected with a force which provides a minimum pressure on the surfaces being thermocompression bonded together of 25 MPa (optionally 25-50 MPa), and at a temperature of 1050° C. for a period of at least 30 minutes.

After the collar assembly 20 has been formed by the thermocompression, the glass welding at 46, 48 and 50 is carried out, followed by the metal welding at 54, 58, 60 and 64, the tube 14 being charged with anode material and the space between the tube 14 and casing 12 being charged with cathode material and molten salt electrolyte, at a convenient stage during the manufacture of the housing 10.

As regards the preparation of the surfaces 72, 74, 76 and 78 with their metallized layers and plated nickel layers [which layers are indicated on the rings 26, 28 and 30 at the surfaces 72, 74, 76 and 78 by cross-hatching] prior to the thermocompression bonding, this is effected (after grinding the surfaces, cleaning them with a hot detergent for ½ hr, rinsing with deionized water, soaking at 65° C. for 5 minutes in a 1:1 by mass solution of technical grade $HNO_3$ in water, rinsing in 80° C. deionized water, and oven drying), e.g. by the method specified in ASTM Designation: F19-64, i.e. by painting the ceramic surface by brush with a paint having the following composition:

| | |
|---|---|
| Molybdenum metal powder of less than 74 micron particle size | 200 g |
| Manganese metal powder of less than 74 micron particle size | 50 g |
| Ethylcellulose | 25 g |
| Methyl amyl acetate | 65 ml |
| Methyl ethyl ketone | 45 ml |
| Ethylene glycol monoethyl ether | 85 ml |
| Acetone | 90 ml |

The paint is mixed by grinding in a ball mill, e.g. of about 1 liter volume, with alumina balls for 100 hrs. The paint is then applied by brush, after having been well stirred, to form a smooth, continuous, uniform coat, the coat preferably being applied in a single brush stroke. Although the above ASTM Designation: F19-64 specifies a 74 micron upper limit for molybdenum particle size, it is preferred to use a 10 micron upper size limit therefor.

After air drying, firing takes place at 1500°-1525° C. in hydrogen which has been bubbled through water and having a dew point of 20°-30° C. After firing, cooling should take place in hydrogen. Heating and cooling take place at the following rates:

| | | |
|---|---|---|
| Heating: | ambient-600° C. | 15 min |
| | 600-1200° C. | 30 min |
| | 1200-1500° C. | 15 min |
| Cooling: | 1500-1000° C. | 5 min |
| | 1000° C.-ambient | 60 min. |

The metallized surfaces are then plated with a nickel layer of 0,013 mm thickness in a nickel plating bath containing 300 g/l $NiCl_2$, 30 g/l $H_2BO_3$ and having a pH adjusted to 3 by HCl. Pure nickel is used for the anode and the bath is operated at 60° C. The metallized rings are mounted on a rack in the bath with contact being made with the metallized surfaces thereof. Plating takes place at a current of 5.5 amps/$m^2$ for 10 minutes, followed by rinsing in deionized water, rinsing in acetone and air drying.

An alternative paint formulation which can be used in the same fashion comprises 160 g of the molybdenum powder together with 4 g of the manganese powder, 100 ml of pyroxylene binder, 50 ml amyl acetate and 50 ml acetone.

As an alternative to the above high temperature metallizations, low temperature metallization is carried out by brush painting the surfaces of the rings, after they have been ground and cleaned as described above, with Type LT-1MH paint supplied by International Technical Associates of Santa Clara, Calif., USA, to a sufficient thickness to give a fired metallized layer thickness in the range 15-25 microns. The painted rings re dried in an oven in air at 200° C. to evaporate solvents and are then fired in a reducing atmosphere comprising a moist mixture of hydrogen and nitrogen in which the $H_2:N_2$ volume ratio is 1:9 and which has a dew point of 20°–30° C. The heating rate is 300° C./hr (or more up to 1000° C./hr) to a temperature of 1000°–1100° C. which is held for 60 minutes. Cooling is at the natural furnace cooling rate of about 200° C./hr.

By appropriate selection of the metal used for the metallizing, substantial bond strengths can be obtained between the metallized layer and the underlying ceramic. Two independent features of the invention are believed to contribute to this, which are essentially unrelated to each other.

Thus, by employing a metallizing step whereby a porous metal matrix or skeleton is achieved, by heating the particles of metal or metal oxide in the paint under a reducing atmosphere, and by ensuring that a glass phase is present, the glass phase can penetrate into this porous matrix, so that the metal is bonded tightly in a physical sense to the glass. The glass in turn, arising from the nature of the ceramic component, bonds tightly to the underlying ceramic and in fact blends into it to form an integral extension thereof.

The second feature is that, by choosing a strong carbide-forming metal for the metallizing metal, the metallizing metal, after reduction under the reducing atmosphere, tends to form equally strong bonds with oxygen atoms in the underlying ceramic and or glass. It is well known that the strong carbide-forming metals also form strong oxides wherein the metals are strongly bonded to oxygen.

With a strongly bonded metallized layer on the ceramic surface, a sufficient proportion of whose area is metal as contrasted with glass phase, thermocompression bonding of the metal component thereto in a reliable fashion to provide a hermetic seal or bond is substantially facilitated. The metallic portion, as contrasted with the glass portion, of the outer surface of the metallized layer also provides an extremely effective substrate for plating a continuous metal surface thereon. Thus, when this plating is employed, formation of a hermetic bond between the plated layer and the metal component is even further improved and facilitated.

While particular metals have been specified hereinabove as being preferred for the metallizing layer, it is in principle naturally possible to use a variety of other metals such as gold, silver, niobium, rhenium, chromium or aluminium therefor, subject to the constraints of cost and compatibility with any electrochemical cell environment to which the bond is exposed.

In further tests conducted by the Applicant, tungsten was used by the Applicant as the metallizing layer metal, instead of molybdenum. After heating to temperatures of 800°–1050° C., bond strengths between the metallized layer and the underlying alpha-alumina were achieved of the order of 90–100 MPa. These bond strengths were essentially unchanged after exposure to molten sodium aluminium chloride which was an equimolar mix of NaCl and $AlCl_3$ at 350° C. for 1 month. In similar immersion tests in molten sodium, the solution usually attacked the underlying alpha-alumina ceramic, but when this attack did not take place a bond strength of 95 MPa was retained after immersion.

It should be noted that the Applicant contemplates using the present invention in the construction of a cell of the type generally shown in FIGS. 1 and 2, in which a molten sodium anode is provided between the tube 14 and side wall 22 of the casing 12. The spacing between said tube and side wall will be at most 0.5 mm and the cell will be operated in an upright condition, as shown in FIG. 1 or inverted by 180° relative to FIG. 1. At its upper end the cell will have a gravity feed sodium reservoir in communication with the anode compartment and axially aligned with the tube 14 and housing 12, so that it does not stand radially proud of the housing.

What is claimed is:

1. A method of joining together a ceramic component and a metal component for use in the construction of a high temperature electrochemical cell, which method comprises the steps of:

metallizing a surface of the ceramic component with a metallizing metal to form a metallized layer thereon; and thermocompression bonding the metal component to the metallized layer, the ceramic component comprising alpha-alumina, the metal of the metallized layer comprising at least one metal selected from the group consisting of tantalum, titanium, vanadium, tungsten and molybdenum, and the metal component comprising at least one metal selected from the group consisting of iron, nickel, cobalt, chromium, manganese and copper, and the metallizing of the surface of the ceramic component comprising forming a metal matrix on said surface, the matrix having a continuous glass phase dispersed therein, the metallizing step including applying the metallizing metal to said surface and then heating the ceramic component to a temperature of above 800° C. under a reducing atmosphere in the presence of glass-forming constituents.

2. A method as claimed in claim 1, in which applying the metallizing metal to the surface of the ceramic component comprises painting said surface with a paint containing, dispersed therein, particles of the metallizing metal or an oxide thereof.

3. A method as claimed in claim 2, in which said particles have an average particle size of at most 10 microns, sufficient paint being applied to said surface to provide a metallized layer which, when polished, displays a polished surface at least 50% of whose area is provided by the metallizing metal, the balance being provided by a glass phase.

4. A method as claimed in claim 1, which includes applying glass-forming constituents to said surface prior to the heating.

5. A method as claimed in claim 1, in which the reducing atmosphere comprises water vapor and comprises at least 10% by volume of hydrogen, any constituent of the atmosphere other than the hydrogen and water being chemically inert with regard to the ceramic component and the metallized layer at the temperature to which the heating takes place.

6. A method as claimed in claim 1, which includes the step, after the metallizing has been effected, of plating the metallized layer with a continuous metal layer having a thickness of at least 2 microns.

7. A method as claimed in claim 1, in which the thermocompression bonding is effected by urging the metal component against the surface of the ceramic component having the metallized layer at a pressure of 5–200 MPa and at a temperature of 800°–1400° C. for a period of 15–90 minutes.

8. A method of joining together a ceramic component and a metal component which comprises the steps of:

metallizing a surface of the ceramic component with a metallizing metal to form a metallized layer thereon; and thermocompression bonding the metal component to the metallized layer, the metallizing of the surface of the ceramic component comprising forming a metal matrix on said surface, the matrix having a continuous glass phase dispersed therein, the metallizing step including applying the metallizing metal to said surface and then heating the ceramic component to a temperature of above 800° C. under a reducing atmosphere in the presence of glass-forming constituents.

9. A method as claimed in claim 8, in which applying the metallizing metal to the surface of the ceramic component comprises painting said surface with a paint containing, dispersed therein, particles of the metallizing metal or an oxide thereof.

10. A method as claimed in claim 9, in which said particles have an average particle size of at most 10 microns, sufficient paint being applied to said surface to provide a metallized layer which, when polished, displays a polished surface at least 50% of whose area is provided by the metallizing metal, the balance being provided by a glass phase.

11. A method as claimed in claim 8, which includes applying glass-forming constituents to said surface prior to the heating.

12. A method as claimed in claim 8, in which the reducing atmosphere comprises water vapor and comprises at least 10% by volume of hydrogen, any constituent of the atmosphere other than the hydrogen and water being chemically inert with regard to the ceramic component and the metallized layer at the temperature to which the heating takes place.

13. A method as claimed in claim 8, which includes the stop, after the metallizing has been effected, of plating the metallized layer with a continuous metal layer having a thickness of at least 2 microns.

14. A method as claimed in claim 8, in which the thermocompression bonding is effected by urging the metal component against the surface of the ceramic component having the metallized layer at a pressure of 5-200 MPa and at a temperature of 800°-1400° C. for a period of 15-19 minutes.

15. A method of joining together a ceramic component and a metal component which comprises the steps of:

metallizing a surface of the ceramic component with a metallizing metal to form a metallized layer thereon; and thermocompression bonding the metal component to the metallized layer, the components being for use in the construction of high temperature electrochemical cells, the ceramic component comprising alpha-alumina, the metal of the metallized layer comprising at least one metal selected from the group consisting of tantalum, titanium, vanadium, tungsten and molybdenum, and the metal component comprising at least one metal selected from the group consisting of iron, nickel, cobalt, chromium, manganese and copper.

16. A method as claimed in claim 15, which includes the step, after the metallizing has been effected, of plating the metallized layer with a continuous metal layer having a thickness of at least 2 microns.

17. A method as claimed in claim 15, in which the thermocompression bonding is effected by urging the metal component against the surface of the ceramic component having the metallized layer at a pressure of 5-200 MPa and at a temperature of 800°-1400° C. for a period of 15-19 minutes.

* * * * *